United States Patent
Copf, Sr. et al.

(10) Patent No.: US 8,690,131 B2
(45) Date of Patent: Apr. 8, 2014

(54) DAMPING DEVICE

(75) Inventors: Franz Copf, Sr., Ludwigsburg (DE);
Desirée Copf, Ludwigsburg (DE); Peter Copf, Remseck am Neckar (DE)

(73) Assignee: Franz Copf Sr, Ludwigsburg (DE)

( * ) Notice: Subject to any disclaimer, the term of this patent is extended or adjusted under 35 U.S.C. 154(b) by 459 days.

(21) Appl. No.: 12/933,153

(22) PCT Filed: Mar. 16, 2009

(86) PCT No.: PCT/EP2009/001907
§ 371 (c)(1),
(2), (4) Date: Dec. 11, 2010

(87) PCT Pub. No.: WO2009/115270
PCT Pub. Date: Sep. 24, 2009

(65) Prior Publication Data
US 2011/0260379 A1    Oct. 27, 2011

(30) Foreign Application Priority Data
Mar. 19, 2008  (DE) .......................... 10 2008 015 106

(51) Int. Cl.
*F16F 5/00*   (2006.01)
(52) U.S. Cl.
USPC .................................... 267/140.11; 52/167.1

(58) Field of Classification Search
USPC ............ 267/140.11, 140.12, 141.2; 248/562, 248/636, 638; 52/2.11, 2.13, 2.22, 167.1, 52/167.6, 167.8
See application file for complete search history.

(56) References Cited

U.S. PATENT DOCUMENTS

| | | | | |
|---|---|---|---|---|
| 5,353,559 A | * | 10/1994 | Murota et al. ................ | 52/167.1 |
| 5,497,861 A | * | 3/1996 | Brotz .......................... | 188/267.1 |
| 8,123,484 B2 | * | 2/2012 | Choi et al. .................... | 416/145 |
| 2009/0049767 A1 | | 2/2009 | Georgakis | |

FOREIGN PATENT DOCUMENTS

| | | | |
|---|---|---|---|
| DE | 004109962 A1 | * | 10/1991 |
| DE | 102004020605 A1 | * | 11/2005 |
| EP | 0555790 A | | 8/1993 |
| JP | 2000249186 A | | 9/2000 |

* cited by examiner

*Primary Examiner* — Pamela Rodriguez
(74) *Attorney, Agent, or Firm* — Andrew Wilford

(57) ABSTRACT

The invention relates to a damping device, particularly earthquake damper, comprising a hollow spherical body filled with a damping fluid (5) and comprising a plurality of damping bodies (10) disposed in the radial direction, the radially interior ends thereof being mounted on a common mounting element disposed in the center of the spherical body, and the radially exterior ends thereof being mounted directly or indirectly on the inner wall of the spherical body.

16 Claims, 4 Drawing Sheets

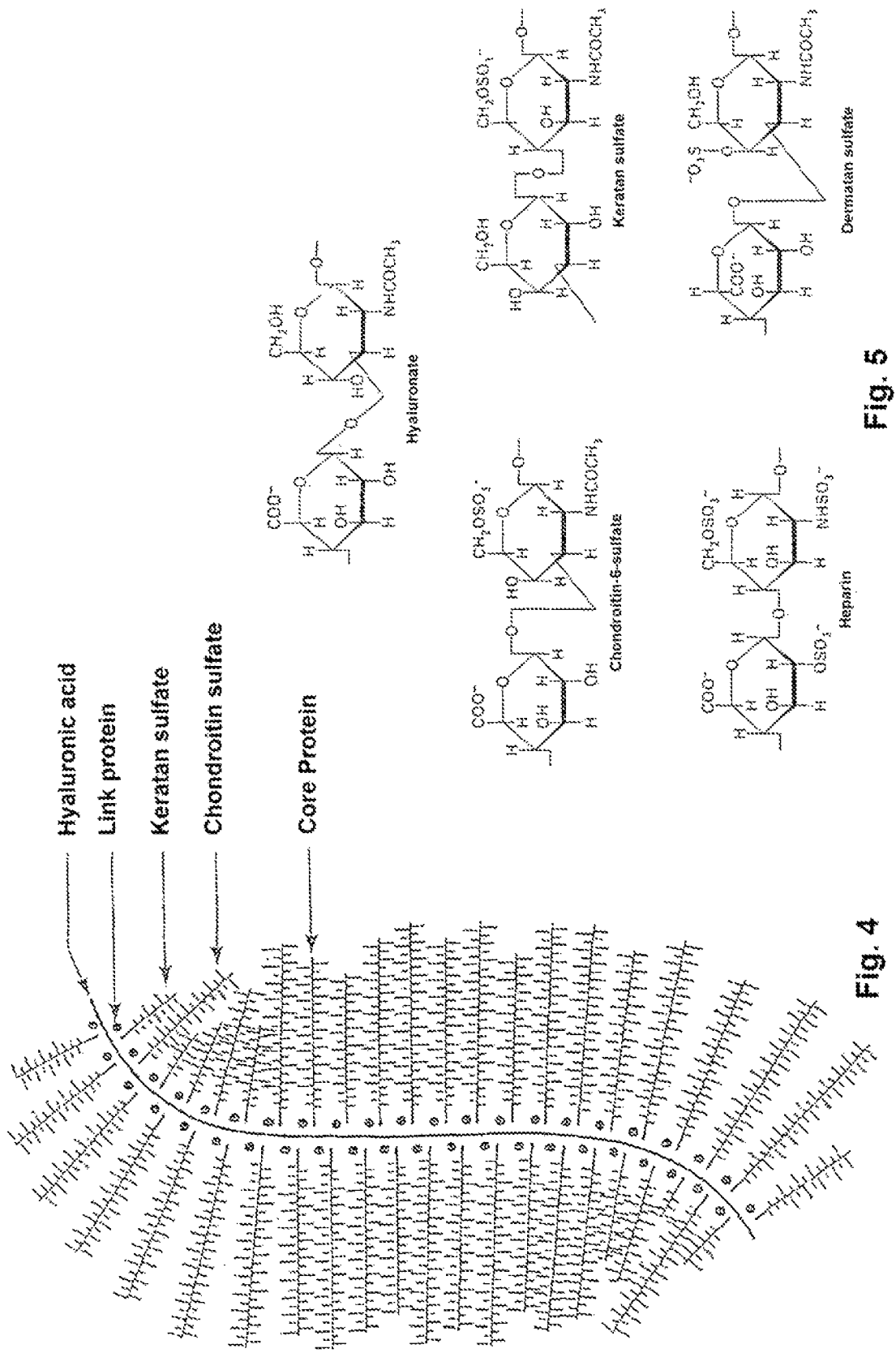

DAMPING DEVICE

CROSS REFERENCE TO RELATED APPLICATIONS

This application is the US national phase of PCT application PCT/EP2009/001907, filed 16 Mar. 2009, published 24 Sep. 2009 as WO2009/115270, and claiming the priority of German patent application 102008015106.8 itself filed 19 Mar. 2008, whose entire disclosures are herewith incorporated by reference.

The invention relates to a damping device, in particular an earthquake damper.

Damping devices are well known in the prior art and are used with many different constructions, for example, to damp shocks, in particular those occurring during earthquakes. Such damping devices are also known in any other applications in which shocks can occur such as, for example, in the motor vehicle sector.

All of them have the disadvantage that the damping with the known damping devices is substantially ideal only in a certain direction as a result of the construction of the damping device. Usually, this involves constructions that allow damping in an ideal manner only in a straight line.

Very often the problem is that objects have to be is securely supported against shocks with damping devices without knowing in advance the direction from which the shocks can act on the object to be supported. This situation exists, for example, during earthquakes. The magnitude of the shocks as well as the direction in which they act, for example, on a building cannot be predicted. Even if this were possible, damping devices of the known type that are already installed cannot be aligned in the appropriate direction from which the shocks occur. Thus, an effective prevention of shocks or vibrations, in particular such as those occurring during earthquakes, is difficult if not completely impossible to achieve.

It is thus the object of the invention to provide a damping device that, with respect to many directions, preferably all directions, has at least substantially equal damping properties. Such a damping device can be used universally without the need to consider a certain mounting direction.

This object is solved by a damping device comprising a hollow spherical body constructed in two parts from two semispherical shells sealingly mounted to one another and filled with a damping fluid and having a plurality of damping bodies extending radially and having their radial inner ends secured to a common mounting element at a center of the spherical body and radial outer ends mounted directly or indirectly on an inner surface of the spherical body.

Thus, such a damping device according to the invention can be structured in a preferred embodiment completely symmetrically with respect to the center of the spherical body, at least with respect the structure inside the spherical body. This ensures that any shocks impinging on the spherical body from any direction are always immediately damped due to the at least substantial symmetry.

Here, the damping device according to the invention achieves substantially two damping effects, namely, on the one hand, due to direct dissipation of energy of acting shocks within the fluid and, as second effect, energy dissipation of the shocks within the damping bodies. Since these are arrayed radially within the spherical body and, moreover, symmetrically with respect to each other, in particular in point symmetry relative to the center of the spherical body, due to the additional damping bodies, the second superimposed damping effect is also at least substantially equal for all directions.

The inner structure of the damping device, thus the arrangement of the damping bodies around the common mounting element, can be created by mounting in direct or indirect manner via intermediate elements on the inner surface of the spherical body and centrally within it. In particular the common mounting element lies in the center of the spherical body. Due to radial arrangement of the damping bodies and the preferred symmetry, this structure consisting of the central mounting element and damping bodies can form a three-dimensional star-shaped arrangement.

Such a spherical body of the damping device according to the invention can be mounted for example in two opposite bearing blocks. Thus, one of the two bearing blocks can be associated, for example, with a foundation and the opposing bearing block with an object to be supported such as, for example, a building.

Due to the spherical construction of the damping device it is also possible to mount the spherical body not only in two opposing bearing blocks but, if necessary, in a plurality of bearing blocks that again are preferably arranged symmetrically around the spherical body.

According to a preferred embodiment of the invention first of all the damping fluid is selected in such a manner that it damps shocks, in particular shock waves propagating within the damping fluid, and damps them in particular to a fraction. For this, for example, a damping fluid can be used having molecules that, upon occurrence of shocks or shock waves traveling through the damping fluid, change their geometry and thereby consume energy. Here, the damping fluid is selected in such a manner that the geometry change is completely and non-destructively reversible.

In a particularly preferred embodiment, this can involve a damping fluid having large molecules with long radicals such as, for example, a fluid that comprises proteoglycans. Such proteoglycans have a feathery structure, for example with a hyaluronic acid as quill, and are able to damp energy input by shockwaves to a high degree. Proteoglycans can form molecule aggregates with masses of approximately $2\times10^6$ and lengths of several micrometers. Thus, viscoelastic properties can be defined to a large extent by proteoglycans. Proteoglycans consist approximately 95% of subunits of polysaccharides and approximately 5% of proteins. The polysaccharide chains of the proteoglycans are formed by glycosaminoglycans that comprise repeating disaccharide units that contain a derivate of an amino sugar, either glucosamine or galactosamine. The most important glycosaminoglycans are, for example hyaluronate, chondroitin sulfate, keratin sulfate, heparane sulfate and heparin.

Such proteoglycans are known, for example, from the cellular tissue, in particular connective tissue and/or bone tissue of living beings. Thus, in a possible embodiment the used damping fluid can be an interossal fluid, in particular a fluid from spongy bone material of animals. For example, such a fluid can be obtained from the bones or tissue of animal carcasses, or, such a damping fluid with the same or at least substantially similar properties can be produced synthetically. For example the interossal fluid can involve a nature-identical but synthetic fluid.

A damping liquid that can be used according to the invention, in particular a fluid comprising proteoglycans, can have, for example the following properties: Density at 21° C. of 0.995 g/cm$^3$, specific weight at 21° C. of 9786 N/m$^3$, dynamic viscosity at 36° C. of 0.23 to 0.25 Pa s.

For a synthetic damping fluid, for example water, physiological saline solution or sea water can be used as base fluid to which proteoglycans are added. Apart from that, blood plasma from living beings, in particular animals, can be used as base fluid.

In a development of the damping fluid the damping fluid can comprise alkalis such as, for example NaOH, in particular to generate compressibility. One can admix alkalis so that a compressibility with respect to the volume of the fluid of several percent, for example 5 to 15%, preferred 10% is achieved.

In a development of the invention the above-described spherical body can be formed not as one piece, but, alternatively, as two pieces from two semispherical shells that are sealingly attached to one another, in particular sealingly fitted into one another and overlapping. Here, in a possible embodiment, each of the semispherical shells can be substantially larger than a purely hemispherical shell so that these two elements can overlap each other in a circumferential area of the spherical body. It is essential here that the semispherical shells are fitted to or into one another in the overlapping area in a sealing manner.

Such a configuration is advantageous because in this manner, at least in certain areas, the two semispherical shells can rotate relative to one another about the common center and, moreover, the two semispherical shells can also moved relative to one another in a linear direction, with the overlap increasing or decreasing at a circumferential area. This, for example, has the advantage that objects, for example buildings, supported on a damping device according to the invention can better transmit their vibrations, in particular those caused during earthquake shocks, into the damping device and in particular into the interior structure of the spherical body. Moreover, during strong movements in a linear direction perpendicular to the plane of overlap it is irreversible deformations at the spherical body are prevented from taking place. To achieve this, the semispherical shells can form an upper and a lower element, each associated with a bearing block.

In a first simple embodiment of the damping device according to the invention the above-described damping bodies can be configured as cylinder-piston assemblies provided with a working fluid, i.e. that the damping bodies correspond substantially to typical shock absorbers that react to tension and/or shear in a damping manner. Here, in particular, the radial outer ends can be mounted on the inner surface of the spherical body.

Here too, in a preferred embodiment the plurality of damping bodies used in this configuration are each arranged symmetrically and extending radially about the center of the spherical body and supported on a common mounting element. The mounting element too can for example have a spherical shape. It is preferred to use at least six such damping bodies, where in each case four of them lie in planes perpendicular to each other.

For any number of damping bodies of this type or the type still to be described hereinafter, two damping bodies are always arranged in a line on either side of the common mounting element.

In this configuration of the damping bodies, the damping functions of fluid and damping body act substantially independent of each other. In contrast, in another preferred configuration according to the invention it is provided that the damping bodies are designed as tubes that are filled with the damping fluid and the ends of which are closed with membranes, wherein each membrane has at least one aperture. Apart from that, these damping bodies is have the same radial arrangement as described above.

This results in an interaction of two damping effects that, on the one hand, are effected by the immediate damping of shock waves during the propagation within the damping fluid and, on the other hand, are effected by the damping fluid flowing within the damping bodies.

Here, by means of the mentioned membrane that has at least one aperture, a cross-section reduction within the tubes is generated resulting in a correspondingly increased flow resistance.

In a further preferred embodiment a tube, in particular each tube, can have at least one further membrane between the mentioned membranes on the ends, and preferably inside the tube a plurality of membranes that also each have at least one aperture. For this, it is preferably provided that the apertures of two successive membranes arranged in the longitudinal extension of the tubes are not aligned.

Here again, a higher flow resistance within the tubes is achieved compared to in an aligned arrangement. A particularly preferred embodiment can be achieved if the apertures of all membranes of a tube lie on a helix. The helical arrangement is to be understood as an arrangement in which the opening of an aperture spacedly surrounds an imaginary helix extending through the tube, and preferably, if the center of the respective aperture lies exactly on the helix.

In a preferred development, the outer ends of the tubes are set in a hollow sphere that is inside the spherical body and that is concentric with the spherical body. The hollow sphere can be mounted, for example, on the inner surface of the spherical body; for example it can be resiliently mounted by tension springs or pressure springs extend radially between the exterior of the hollow sphere and the interior of the spherical body.

In this manner, a stable position of the hollow sphere relative to the spherical body is achieved, with the centers of hollow sphere and spherical body preferably coincident so that such tubes also extend substantially radially are arranged at least in a substantially stationary manner within the spherical body. The arrangement of the tubes ensures, at least with their radial outer end regions, in such a hollow sphere that according to the invention a shock wave impinging on the spherical body causes a pressure difference between an outer and an inner area of the spherical body, which are separated by the hollow sphere, so that hereby a directed flow of the damping fluid through the tubes takes place in order to achieve pressure equalization.

Instead of arranging the tubes only with their radial outer ends in the mentioned hollow sphere the tubes are arrayed with their ends exactly at the surface of the inner hollow sphere so that the membranes of the radial outer ends of the tubes virtually form a portion of the spherical surface.

In a further preferred configuration not only one hollow sphere is provided within the spherical body, but a plurality of hollow spheres arranged within each other that each have the same center at that of the spherical body, the tubes here projecting in particular in a sealed manner, through all hollow spheres radially. This ensures in a preferred embodiment that damping fluid cannot penetrate through areas between the tubes and surfaces of the hollow spheres. For example, for this purpose, the tubes and hollow spheres that, for example can be made of metal, can be adhered, soldered, or welded together or can be sealingly joined together in a different manner. Also, the outermost spherical body, which consists of one part or also of two semispherical shells, can be made of metal. The tubes can be formed, for example at least with respect to their wall material and/or membrane material, in an elastic manner, for example from an elastomer such as rubber, etc.

For reasons of optimum space utilization in all of the previously mentioned embodiments, the cross-section of the tubes radially decreases from the outside inward. The tubes can preferably be frustoconical.

In a further embodiment the tubes and/or the hollow spheres are perforated. Here too, flow of damping fluid through the holes can contribute to a further damping and this, on the one hand through the direct flow resistances and, on the other, through the forces acting on the damping fluid due to the flow and the associated geometry change of the molecules as has been mentioned above as being essential for the damping fluid.

In yet another embodiment, the bearing blocks also carry a device for damping shocks, for example in straight line. Here too, this can involve damping devices that are filled with the mentioned damping fluid and damping bodies of the mentioned type, these damping devices being formed from two damping elements that are sealingly and linearly displaceable relative to each other and between which, instead of the radial arrangement in the above-mentioned embodiment according to the invention, the damping bodies are now arranged in a line longitudinally of the device. Here, the inner volume can be divided by at least one partition through which the above-described tubular dampers extend parallel to each other in a line.

Embodiments of the invention are illustrated in the drawing described below. Therein:

FIG. 4 shows a schematic view of a proteoglycan, FIG. 5 shows a structural formula of the disaccharide units of some important glycosaminoglycans.

Figure 1:
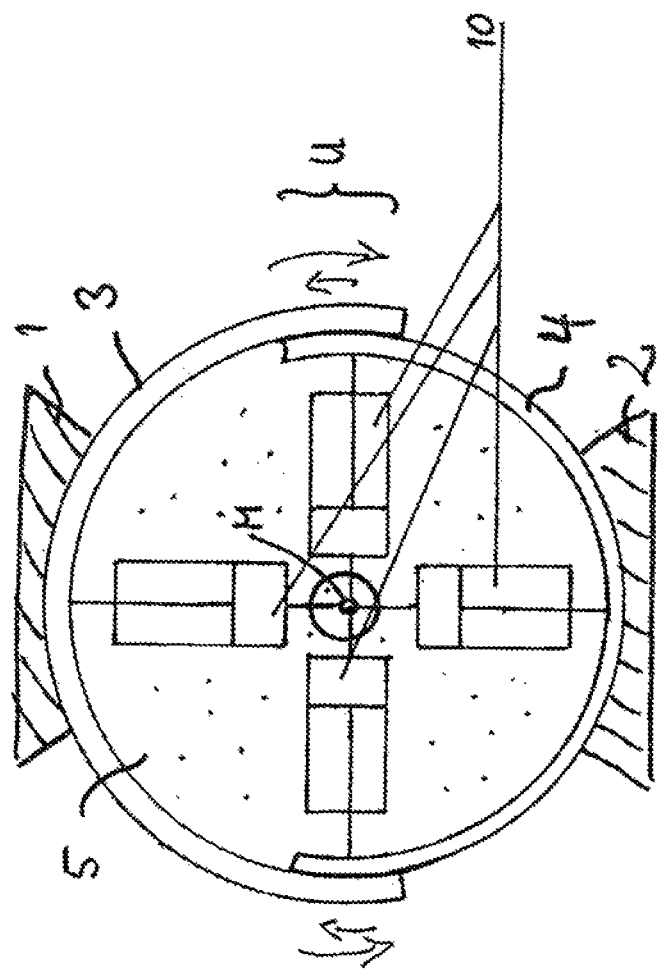
FIG. 1 shows a first embodiment with hydraulic damping bodies.

FIG. 1 here shows an example of a possible embodiment of the invention with a hollow spherical body composed of two substantially semispherical shells 3 and 4 that in this embodiment form lower and upper elements and overlap each other in a substantially horizontally extending equatorial region U.

Thus, these two semispherical shells can rotate at least in certain areas around the illustrated center M of the spherical body and can also move vertically relative to each other, whereby the overlapping zone U increases or decreases.

Here the upper semispherical shell 3 is shown to be is mounted in or on an upper bearing block 1, and the lower semispherical shell 4 is mounted on a lower bearing block 2 that, for example, can be a foundation, whereas the above-described bearing block 1 can be connected to an object such as, for example, a building. Here, the two semispherical shells 3 and 4 can be made, for example, from metal and can preferably have the same wall thickness, the lower semispherical shell 4 having a slightly smaller diameter than the upper one so that they can be fitted into one another in the overlapping area.

The inner volume of the spherical body according to the invention configured in this manner is filled with a damping fluid 5 having the properties mentioned in the general description. Such a fluid is also designated as an "ideal fluid" according to Max Planck. The properties of such an "ideal fluid" are actually achieved at least approximately in nature, for example, by the types of fluids mentioned above.

Further shown is an array of hydraulic shock absorbers 10 that is symmetrical with respect to the center M of the spherical body, the shock absorbers having their own working fluid such as, for example hydraulic oil. Under tensile load as well as under shear load, these shock absorbers damp by internal flow of the fluid, for example through the piston. The shock absorbers 10 illustrated here are arrayed symmetrically to the center of the spherical body, and in this embodiment there is a total of six shock absorbers 10 with four of them always in a plane so that two planes are generated here that are perpendicular to each other and that each have the four shock absorbers.

Shock waves impinging the damper according to the invention such as, for example, earthquake shock waves are thus damped by the internal shock absorbers 10 as well as in the damping fluid 5.

Figure 2:
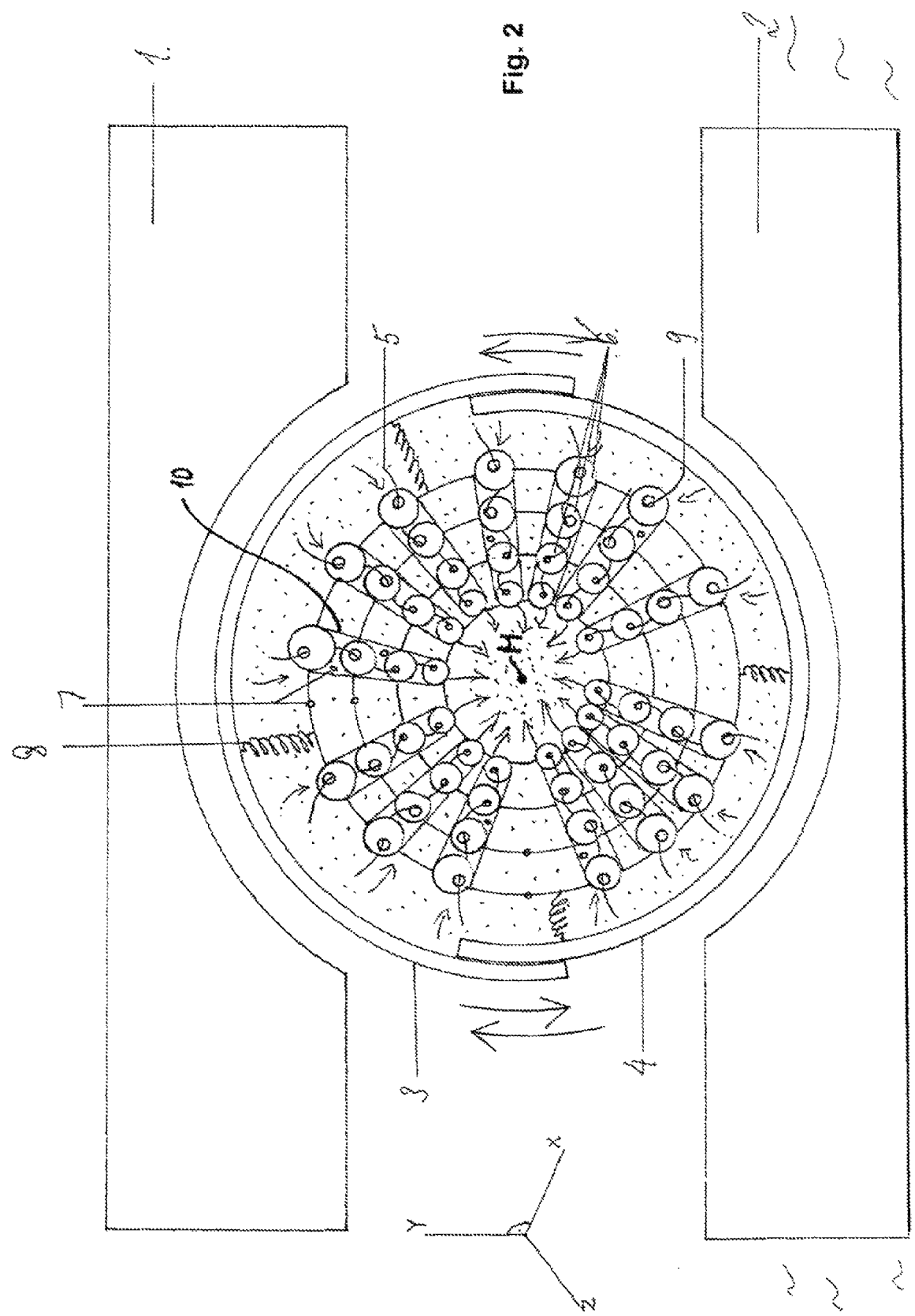
FIG. 2 shows a second embodiment according to the invention with tubular tubes filled with damping fluid.

In contrast, FIG. 2 shows a further preferred embodiment having in principle the same external construction as the one in FIG. 1, but here the internal construction inside the spherical body formed by the two spherical body elements 3 and 4 is different.

Here the interior of the spherical body holds a plurality of hollow spheres 7 concentric to the same center M that is the center of the spherical body. Here, the hollow spheres 7 are spaced substantially equidistantly from one another; however, this is not mandatory. Tubular damping bodies 10 extend radially through the hollow spheres 7 and have radial outer ends projecting to or past the largest of the inner hollow spheres 7. The outer as well as the inner ends of the tubes have membranes 6 with apertures 6a, and between these end membranes 6 there are further membranes 6 with apertures 6a and all the apertures 6a of these membranes 6 lie on a helix 9. Furthermore, the tube walls have small holes 10a and so do the hollow spheres 7 themselves. In this manner in the event of incoming shock waves, due to the pressure differences within the spherical body according to the invention, not only a damping due to the propagating shock waves takes place, but also a damping due to the flow of damping fluid 5 inside the tubes 10.

Here too, the construction is such that the radially inner ends are all supported on a common mounting element at the center of the spherical body. Here too, this may as well be a hollow sphere 7.

To achieve a stable orientation of the interior structure in the spherical body here the outermost hollow spheres 7 are braced resiliently by springs 8 on the inner surface of the spherical body. Thus, the centers M of the individual hollow spheres 7 will coincide at least in a rest position with that of the spherical body.

Figure 3:
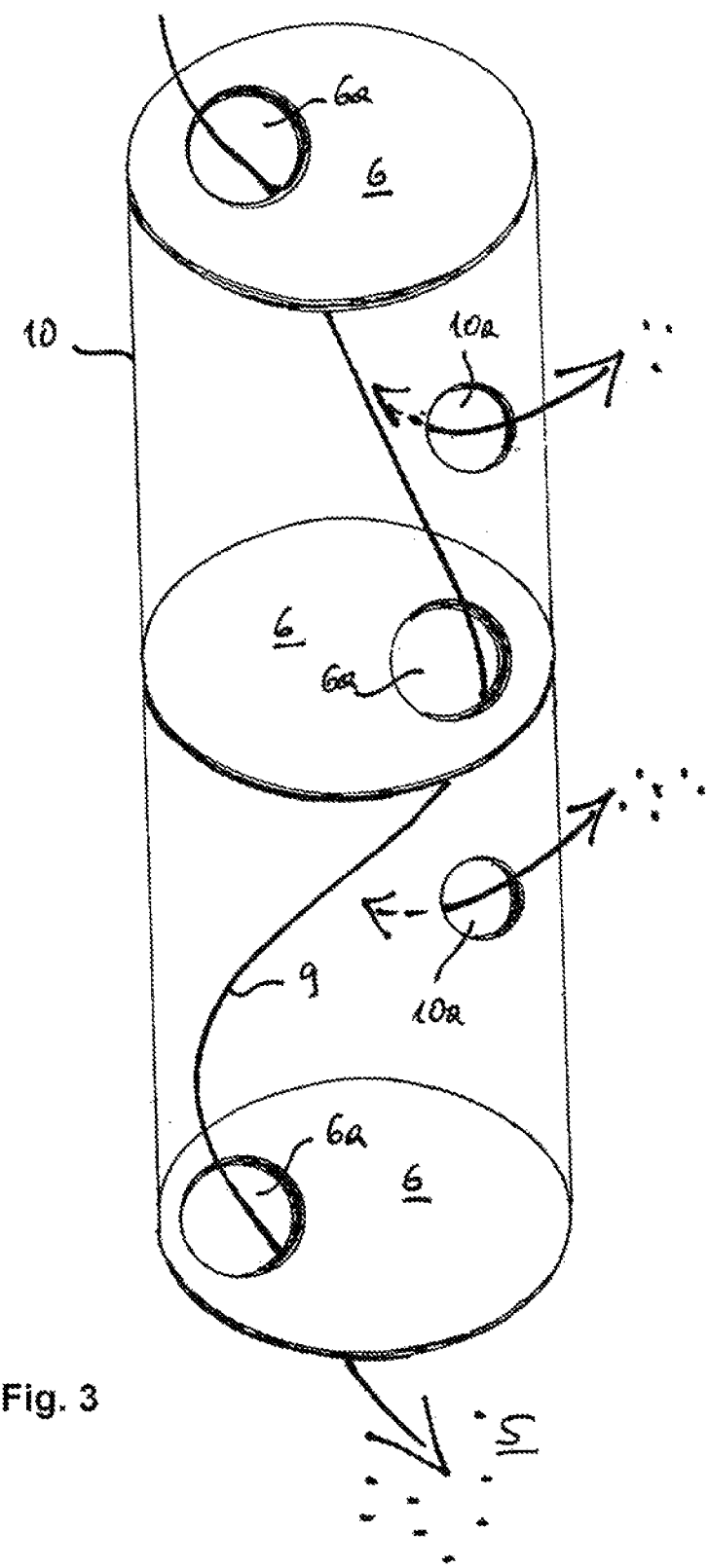
FIG. 3 shows a detailed view of a tubular damping body.

FIG. 3 shows a supplementary and more detailed illustration of a tubular damping body 10 as used in the embodiment according to FIG. 2. Here, an embodiment is illustrated in which no reduction in cross section takes place radially, but the tube is cylindrical. Here the upper and the lower end faces are covered by a membrane 6 having an eccentric aperture 6a. Between these two membranes 6 on either end, as an example, only one further membrane 6 is arranged, and the illustrated helix 9 makes apparent that all openings 6a of the membrane 6 of the tube lie on this helix 9. Here, the wall of the tube 10 have apertures 10a as well.

It has to be noted that the figures herein are to be understood as examples only and do not illustrate the subject matter of the invention to scale, but only schematically. Thus, the tubes can have much smaller dimensions relative to the spherical body, than is schematically illustrated here. The figures are by no means to be understood as being to scale.

It can be however that the tubes as well as the apertures in the membranes and the holes in the tube walls or hollow spheres have diameters in the micrometer range. Preferably, the dimensions of the tube diameters can be in the range from 20 to 200 micrometers, further preferably from 40 to 60 micrometers, and the openings in the tube walls, membranes or hollow spheres can be in the range from 3 to 40 micrometers, further preferred 5 to 10 micrometers. Specifically the embodiment with such small dimensions in the micrometer range has the advantage that in a damping fluid with proteoglycans or other long-chain molecules, the long-chain molecules lose a lot of energy when flowing through the small cross-sections.

The damping device described herein can be used not only for damping earthquake shocks but principally for all applications in which the effect of shocks upon an object is to be minimized.

FIG. 4 schematically shows a proteoglycans molecule. Shown is a hyaluronic acid quill to which glycosaminoglycans are linked. Such a molecule can have a length from one to several micrometers. FIG. 5 shows by way of example some disaccharide-units of important glycosaminoglycans. Fluids that comprise such molecules thus can have excellent damping properties.

With respect to all embodiments it is to be noted that the technical features described in connection with one of the embodiments can be used or are used not only in the specific embodiment but also in each of the other embodiments. All disclosed technical features of this description of the invention are to be considered as essential for the invention and can be used in any combination or alone. Mentioning, throughout the entire disclosure, that a feature can be provided or a method step can be carried out is also to be understood as an embodiment of the invention in which the respective feature is provided or a respective method step is carried out.

The invention claimed is:

1. A damping device usable as an earthquake damper, the device comprising:
a hollow spherical body constructed in two parts from two semispherical shells sealingly mounted to one another,
a damping fluid filling the spherical body,
a common mounting element at a center of the spherical body; and
a plurality of damping tubes filled with the damping fluid and having ends closed by membranes each having at least one aperture, the tubes extending radially and having radial inner ends secured to the common mounting element and radial outer ends mounted at least indirectly on an inner surface of the spherical body.

2. The damping device according to claim 1, wherein the damping fluid comprises molecules whose geometric change during shocks consumes energy.

3. The damping device according to claim 2, wherein the damping fluid comprises proteoglycans, with an admixture of alkalis.

4. The damping device according to claim 2 wherein the damping fluid is an interossal fluid obtained from spongy bone material of animals.

5. The damping device according to claim 1 wherein the two semispherical shells are sealingly fitted into one another in an overlapping manner.

6. The damping device according to claim 1, wherein each tube contains between the membranes on the ends at least one further membrane that has at least one aperture.

7. The damping device according to claim 1, wherein the apertures of two successive membranes spaced longitudinally in the tubes are not aligned.

8. The damping device according to claim 7, wherein the apertures of all membranes of a tube lie on a helix.

9. The damping device according to claim 1 wherein the tubes engage at their radial outer ends on a hollow sphere that is centered on the center of the spherical body and that is mounted resiliently on the inner surface of the spherical body.

10. The damping device according to claim 1 wherein the spherical body has a plurality of hollow spheres within one another with the same center, the tubes extending through the hollow spheres radially and in a sealed manner.

11. The damping device according to claim 1, wherein the tubes or the hollow spheres are perforated.

12. The damping device according to that claim 1, further comprising:
at least two bearing blocks symmetrically flanking and holding the spherical body.

13. A damping device comprising:
a pair of generally semispherical shells centered generally on a common point and fitted together in an overlapping manner at an equatorial plane and forming a substantially closed chamber;
a mounting element at the point in the chamber;
a plurality of damping tubes having ends closed by membranes each having at least one aperture, the tubes extending radially in the chamber and having radial inner ends braced against the mounting element and radial outer ends braced radially outwardly on inner surfaces of the shells; and
a body of damping fluid filling the tubes and the chamber.

14. The damping device defined in claim 13, further comprising:
a plurality of radially spaced hollow spherical bodies nested within each other in the compartment between the inner surfaces and the mounting element, the damping tubes being connected to the spherical bodies.

15. The damping device defined in claim 14 wherein the damping tubes extend radially through at least some of the hollow bodies.

16. The damping device defined in claim 15, further comprising:
springs engaging radially between an outermost one of the hollow bodies and the inner surfaces.

* * * * *